3,010,960
7-METHYL - 5,8(9) - PREGNADIENE-3,11,20-TRIONE 3,20-BIS ETHYLENE KETAL AND PROCESS FOR THE PRODUCTION THEREOF
Philip F. Beal III, Kalamazoo, Mich., assignor to The Upjohn Company, Kalamazoo, Mich., a corporation of Delaware
No Drawing. Filed Aug. 19, 1959, Ser. No. 834,661
6 Claims. (Cl. 260—239.55)

This invention relates to novel 7α- and 7β-methyl steroids and is more particularly concerned with 7-methyl-11α-hydroxy-4-pregnene-3,20-dione, 7 - methyl-4-pregnene-3,11,20-trione and alkyl esters of 7-methyl-3,11-diketo-4,17(20)-pregnadien-21-oic acid and intermediates and methods used in the preparation thereof.

The novel compounds of the present invention and a process for the preparation thereof may be illustrated by the following reaction scheme:

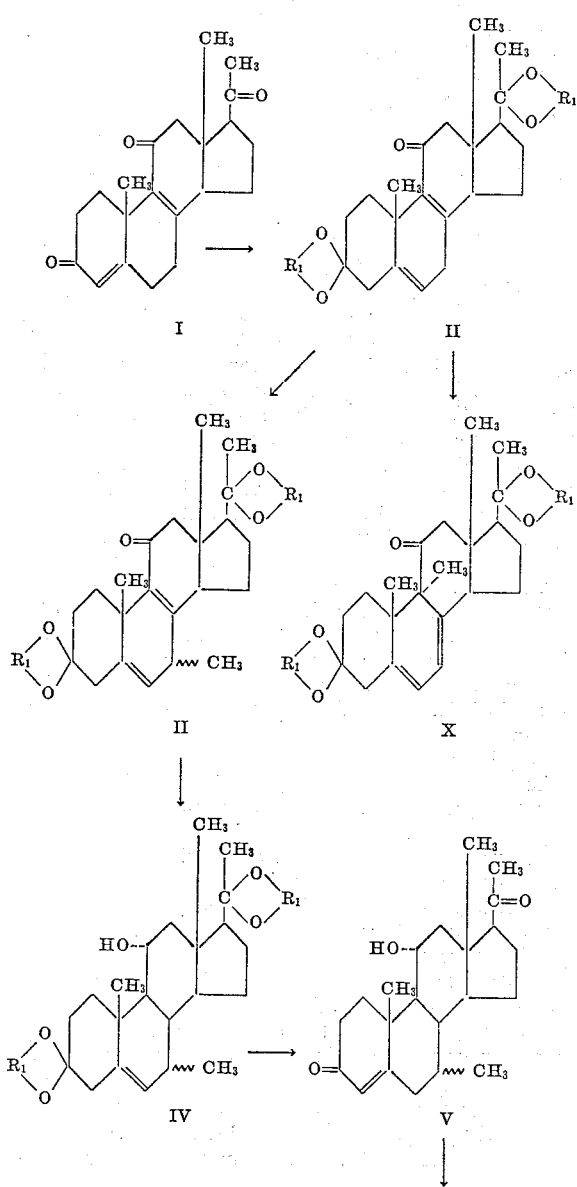

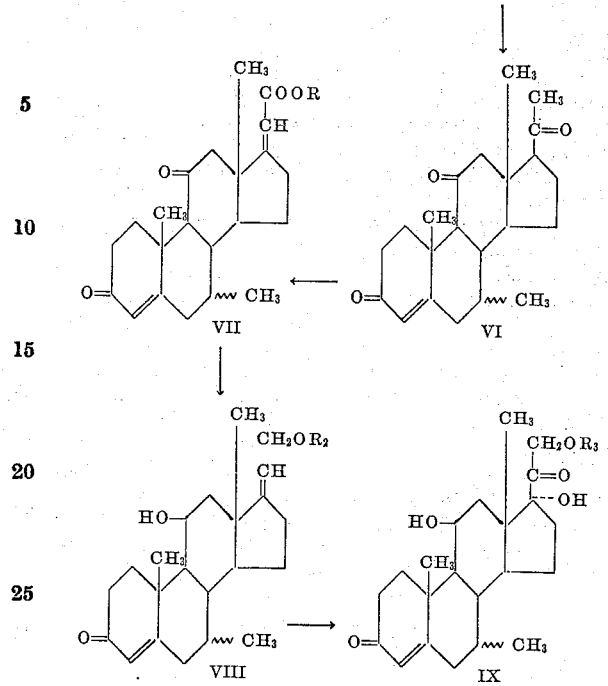

wherein R is hydrogen or an alkyl radical containing from 1 to 8 carbon atoms, inclusive, $R_1$ is an alkylene radical containing not more than 8 carbon atoms, inclusive, and the attaching oxygen to carbon bonds are separated by a chain of at least 2 and not more than 3 carbon atoms, and $R_2$ is hydrogen or the acyl radical of an organic carboxylic acid, preferably a hydrocarbon carboxylic acid, containing from 1 to 12 carbon atoms, inclusive.

In this application the wavy line ( $\xi$ ) appearing at the 7-position in the structural formulas depicted above is a generic expression including the alpha (α) and beta (β) configuration. Whenever the term "7-methyl" is used in the specification portion of this application, it is to be understood to include the alpha (α) and beta (β) configuration.

The compounds of Formulas V, 7-methyl-11α-hydroxy-4-pregnene-3,20-dione; VI, 7-methyl - 4 - pregnene-3,11,20-trione; and VII, alkyl esters of 7-methyl-3,11-diketo - 4,17(20) - pregnadien-21-oic acid, possess useful therapeutic properties. The compounds of Formulas V through VII affect the secretion of gonadotropins and thus regulate ovulation and endometrial and placental development, and, particularly when used in conjunction with estrogens, e.g., ethinylestradiol and/or androgens, e.g., 9α-fluoro-11β-hydroxy-17-methyltestosterone, reduce fertility, and are useful for the treatment of dysmennorhea, amenorrhea, endometriosis, threatened abortion and related gynecological disorders and possess progestational, anti-inflammatory, glucocorticoid, diuretic and central nervous system modifying activity.

Compositions containing the compounds of the present invention can be prepared for human or animal use by incorporating them in any one of the several dosage forms, such as pills, tablets, capsules, solutions or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides, or other materials forming advantageous combinations therewith.

The compounds of Formulas III through VII are useful intermediates in the preparation of other valuable compounds. The compounds of Formula VII are converted into the compounds of Formula VIII, for example, 7-methyl - 11β,21 - dihydroxy-4,17(20)-[cis]-pregnadien-3-one 21-acetate, according to the procedures disclosed in U.S. Patent No. 2,781,343 and as disclosed in Examples 5 and 11 below.

The compounds of Formula VIII are in turn converted to the compounds of Formula IX, for example, 7-methyl-11β,17α,21 - trihydroxy - 4 - pregnene - 3,20-dione 21-acetate, according to the procedures disclosed in U.S. Patent No. 2,838,534 and as disclosed in Examples 6 and 12 below.

The process of the present invention comprises treating 4,8(9)-pregnadiene-3,11,20-trione (prepared according to the procedure disclosed in U.S. Patent No. 2,835,680), the compound of Formula I, with ethylene glycol in the presence of a strong acid catalyst, such as toluenesulfonic acid, ortho-chlorobenzenesulfonic acid, sulfuric acid, or the like, to obtain 5,8(9)-pregnadiene-3,11,20-trione 3,20-bis-(ethylene ketal), Formula II, which is recovered by conventional means, for example, chromatography and/or crystallization.

Similarly, the compound of Formula I can be reacted with other 1,2-alkane diols or 1,3-alkane diols such as propylene glycol, butane-1,2-diol, butane-1,3-diol, pentane-1,2- and 1,3-diol, hexane-1,2- and 1,3-diol, heptane-1,2- and 1,3-diol or other alkane diols of the formula:

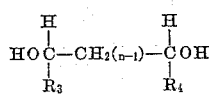

wherein $n$ is an integer having a value of from 1 to 2, inclusive, and $R_3$ and $R_4$ are selected from the group consisting of hydrogen and lower-alkyl radicals containing up to 6 carbon atoms, and wherein the total number of carbon atoms in the alkane diol is up to and including 8 carbon atoms, to obtain the corresponding 3,20-bis-(alkylene ketals) of 5,8(9)-pregnadiene-3,11,20-trione.

The compounds of Formula II are then treated with a methyl halide, preferably methyl iodide, in the presence of a lower-alkyl alcohol, such as methyl, ethyl, propyl, isopropyl, butyl, isobutyl, or tertiary butyl alcohol, or the like, and a base catalyst, such as an alkali metal lower alkoxide, such as sodium, potassium, or lithium methoxide, ethoxide, propoxide, isopropoxide, butoxide, isobutoxide, tertiary butoxide, and the like, or trityl sodium, trityl potassium, and trityl lithium, to convert them into the compounds of Formula III, for example, 7-methyl-5,8(9)-pregnadiene-3,11,20-trione 3,20 - bis - (ethylene ketal) [or other 3,20-bis-(alkylene ketals)], and the compounds of Formula X, for example, 9α-methyl-5,7-pregnadiene-3,11,20-trione 3,20-bis-(ethylene ketal) [or other 3,20-bis-(alkylene ketals)]. The compounds of Formula X are useful intermediates in the preparation of 9α-methyl-11-keto-progesterone which exhibits anti-inflammatory, glucocorticoid, and mineral regulating, pituitary inhibiting, and central nervous system depressant properties of improved therapeutic ratio.

The preferred method for the conversion of the compounds of Formula II to the compounds of Formulas III and X is to carry out the reaction with methyl iodide in the presence of tertiary butyl alcohol using potassium tertiary butoxide as catalyst. The compounds of Formula III are separated from the compounds of Formula X by conventional means, such as chromatography, and/or crystallization and the like.

The thus-obtained compounds of Formula III are then reduced with a reducing agent, for example, a solution of an alkali-metal, such as lithium, potassium and sodium in ammonia or ammonia-alcohol mixtures. The reduction is preferably carried out using metallic lithium in ammonia, in the presence of an organic solvent, for example, dioxane, ether, or the like, preferably dioxane, to obtain the compounds of Formula IV, such as 7-methyl-11α-hydroxy-5-pregnene-3,20-dione 3,20-bis-(ethylene ketal) [or other 3,20-bis-(alkylene ketals)] which are recovered by conventional means and purified, for example, by chromatography and/or crystallization.

The compounds of Formula IV, dissolved in an inert organic solvent, for example, acetone, dioxane, alcohols, such as methanol and ethanol, or the like, or mixtures thereof, preferably a mixture of acetone and dioxane, are then converted to the compounds of Formula V, 7-methyl-11α-hydroxy-4-pregnene-3,20-dione, by treatment with an aqueous acid, preferably a mineral acid such as, for example, sulfuric or hydrochloric acid, usually at about room temperature, for from about one-half hour to about 72 hours, followed by recovery of compounds of Formula V by conventional means, for example, evaporation of the solvent. The amount of acid employed is usually from about a trace to a large molar excess and concentrations from extremely dilute to fairly concentrated may be employed. Dilute solutions of the acid to effect hydrolysis are ordinarily preferred.

The compounds of Formula V are then converted to the compounds of Formula VI, 7-methyl-4-pregnene-3,11,20-trione, by treatment with an oxidizing agent, for example, sodium dichromate dihydrate, chromium trioxide, chromic acid or the like, preferably sodium dichromate dihydrate, in the presence of an organic solvent, followed by recovery of the compounds of Formula VI.

In preparing the compounds of Formula VI from the compounds of Formula III, it is not essential that the intermediates, namely, the compounds of Formulas IV and V, be isolated in the pure state since the reactions can be carried out on the crude materials produced.

The compounds of Formula VI are then converted to the compounds of Formula VII, alkyl esters of 7-methyl-3,11-diketo-4,17(20)-pregnadien-21-oic acid, by a series of steps involving (1) diglyoxalation (condensation), (2) halogenation, (3) elimination and rearrangement and (4) dehalogenation at position 2 of the steroid nucleus. The conversion of the compounds of Formula VI to the compounds of Formula VII is preferably carried out without isolating the intermediate products formed. However, it is of course to be understood that isolations can be effected, if desired, at any one of the steps in the procedure for the conversion of the compounds of Formula VI to the compounds of Formula VII.

In carrying out the diglyoxalation step (1), 7-methyl-4-pregnene-3,11,20-trione, the compounds of Formula VI, are mixed with at least about 1 molar equivalent each of an alkyl diester of oxalic acid and an alkali-metal base condensing agent to produce a reaction product which includes a $\Delta^4$-3,20-diketo - 2,21 - dialkoxyoxalyl alkali-metal dienolate steroid. This step is usually performed in a solvent such as, for example, benzene, methanol, ethanol, tertiary butyl alcohol, tetrahydrofuran, ether, Skellysolve B hexane hydrocarbons, or mixtures of these or other essentially non-reactive solvents. Benzene, with or without small percentages of added alkanol, and tertiary butyl alcohol, are usually preferred solvents, and of these, tertiary butyl alcohol is usually preferred if all of the four steps of the present invention are to be carried out without any isolation.

The preferred alkyl diesters of oxalic acid used in the diglyoxalation step are ethyl oxalate and methyl oxalate. However, other alkyl diesters of oxalic acid, such as, for example, propyl oxalate, butyl oxalate, amyl oxalate, and the like, can be employed.

Room temperature is the preferred reaction temperature for the diglyoxalation step (1), although temperatures between about 0° C. and the boiling point of the reaction mixture can be used. Reaction times may vary from less than one-half hour to several days, depending upon the solvent, the reaction temperature, the starting reactants, the amount of moisture present in the reaction, and the molar ratio of reactants employed. When sodium methoxide or ethoxide and methyl or ethyl oxalate are employed, the reaction is usually essentially complete in about 4 hours or less. The reaction is preferably carried out in the absence of any significant amounts of water in any form, and since the reaction appears to be somewhat reversible in the presence of an alkanol, large amounts of added methyl or ethyl alcohol, which sometimes tend to reduce the yield of desired product, are usually avoided.

Alkali-metal base condensation agents which may be used include the preferred alkali-metal alkoxides, e.g., sodium methoxide, sodium ethoxide, potassium tertiary butoxide, lithium methoxide, and the like, the alkali metals, e.g., sodium amide, triphenyl methyl sodium, and the like. Of these, sodium methoxide and sodium ethoxide are preferred for their convenience. The alkali-metal alkoxide may be used solvent-free, dissolved or suspended in a non-reactive solvent, or in situ in the alkanol in which said alkali-metal alkoxide was prepared. When potassium is used, it is usually used as the solution formed by its reaction with tertiary butyl alcohol according to procedures well known in the art.

When close to about 1 molar equivalent of alkali-metal base condensing agent is employed per mole of starting steroid, the above-described reaction usually produces predominantly a monoglyoxalated product, whereas when closer to 2 molar equivalents of base are employed, the mixture is of somewhat more equal proportions of the mono- and diglyoxalate products. When substantially greater than about 2 molar equivalents of base are employed, the product is usually essentially all diglyoxalated product. In some cases, a portion of the monoglyoxalated product tends to precipitate from the reaction mixture, lessening completeness of the diglyoxalation to a certain but unimportant extent. The presence of substantially greater than about 2 molar equivalents of a dialkyl ester of oxalic acid in the reaction mixture promotes the production of optimum yields of the desired reaction product, regardless of the selected proportion of base to be employed. The production of all diglyoxalated product requires at least about 2 molar equivalents of an alkyl diester of oxalic acid as well as at least about 2 molar equivalents of base condensing agent, and therefore, when it is desired to isolate the diglyoxalated product, such proportions of reactants are preferred.

The thus-produced glyoxalated product can then be isolated by precipitation or by other procedure or used directly without isolation in the next step of the process. Usually it is not desirable to isolate or purify the thus-glyoxalated product unless it is wished to obtain the 2,21-dialkoxyoxalyl steroid as an isolated product. Isolation for purification or other purposes is conveniently achieved if desired by the addition to the mixture of a solvent in which the alkali-metal enolate is insoluble or by the addition of aqueous acid, if the free enol is the desired product, and then isolating the free enol by conventional procedure.

The halogenation step (2) involves reaction of the steroid condensation product from the diglyoxalation step (1) with at least about 2 molar equivalents of a halogen having an atomic weight from 35 to 80, inclusive, i.e., chlorine or bromine, but not substantially exceeding that amount required to maintain free halogen in the reaction mixture, to produce a steroid halogenation product which includes a $\Delta^4$-3,20-diketo-2,21,21-trihalo-2,21-dialkoxyoxalyl steroid. This step may be performed directly on the crude or unisolated total reaction product from the diglyoxalation step (1). Although this halogenation may be performed under somewhat acidic or essentially neutral conditions, the reaction is preferably conducted under slightly basic conditions.

If more than about 2 molar equivalents of alkali-metal base condensing agent per mole of steroid are used in the condensation step, and if the 2,21-dialkoxyoxalyl steroid is not isolated in the diglyoxalation step (1), then the total reaction product at this point will include the excess alkali-metal base condensing agent. However, the presence of this excess base condensing agent appears to be somewhat disadvantageous in the halogenation step. Therefore, if this total reaction product is used as starting material for the halogenation step, the excess base condensing agent is preferably decomposed by the addition of the number of molar equivalents of aliphatic carboxylic acid, preferably acetic acid, theoretically required to decompose any excess alkali-metal base condensing agent remaining in the reaction mixture. Since it may sometimes be difficult to determine how much excess alkali-metal base condensing agent is present in the crude reaction mixture from the diglyoxalation step (1), a preferred procedure comprises the addition of an aliphatic carboxylic acid to the mixture in an amount chemically equivalent to the alkali-metal base condensing agent employed in the diglyoxalation step (1). This preferred procedure results in a weakly basic medium due to the formation of an alkali-metal salt of the acid used for the decomposition.

The halogenation step, under such conditions of operation, is performed on the free enol form of the condensation product. Representative acids which may be used for this purpose include formic, acetic, propionic, dimethylacetic, octanoic, or like acid, with acetic acid being preferred.

When the starting material for the halogenation step (2) is the total steroid reaction product from the condensation step (1), there may be present therein a mixture of $\Delta^4$-3,20-diketo-21 alkoxyoxalyl alkali-metal enolate steroid and $\Delta^4$-3,20-diketo-2,21-dialkoxyoxalyl alkali-metal dienolate steroid or essentially all dienolate steroid. If the halogenation reaction is performed in the presence of added aliphatic carboxylic acid, these alkali-metal enolates are converted to the free enols and, as previously stated, the halogenation is performed on the free enols.

This halogenation step (2) results in the production of about 1 mole of hydrogen halide per mole of starting steroid, which hydrogen halide will remain in the reaction mixture if no base is present to react therewith. The presence of this hydrogen halide in the reaction mixture appears to be somewhat undesirable and it is therefore preferably decomposed in situ as it is formed by a chemical equivalent or greater amount of a suitable base present in the reaction mixture during the halogenation step. Suitable bases are those bases which are of sufficient strength to decompose the hydrogen halide but preferably not strong enough to react to any appreciable extent with the product of the halogenation, such as, for example, alkali-metal salts of aliphatic carboxylic acids, potassium octanoate, amines, urea, aluminum hydroxide, triphenyl amine, and the like. The alkali-metal salts of aliphatic carboxylic acids appear to be most desirable and, of those, sodium acetate and potassium acetate are preferred. As was previously stated, any excess alkali-metal base condensing agent remaining after the condensation step (1) appears to be detrimental in the halogenation step, so this basic condensing agent is therefore preferably not employed for the decomposition of the hydrogen halide. However, the salt resulting from decomposition of excess alkali-metal base condensing gent with an aliphatic carboxylic acid is of sufficient basicity to react with the hydrogen halide and is therefore satisfactory for this purpose. If no excess alkali-metal base condensing agent is employed in the condensation step, or if the amount employed is insufficient to provide, upon reaction with the aliphatic carboxylic acid, a chemical equivalent amount of base to react with the hydrogen halide formed, then more base of the type stated above should be added to the reaction mixture prior to the halogenation. The minimum number of molar equivalents added should preferably total at least 1 when added to the number of molar equivalents of aliphatic acid added at the end of condensation step (1) to decompose any excess alkali-metal base condensing agent. This minimum amount will ensure that all of the hydrogen halide is decomposed as it is formed during the halogenation step (2).

The amount of chlorine or bromine which need be added to completely react with the glyoxalated material to produce the $\Delta^4$ - 3,20 - diketo-2,21,21-trihalo-2,21-dialkoxyoxalyl steroids and $\Delta^4$-3,20-diketo-21,21-dihalo-21-alkoxyoxalyl steroids varies somewhat between about 2 and 3 molar equivalents per mole of starting glyoxalated steroid, depending upon the exact composition of the product of the condensation step (1). When bromine is the halogenating agent, the exact amount required can be readily determined by observing the reaction mixture for the persistent color of free bromine. Moreover, since the starting material is usually colored and the reaction mixture usually becomes colorless just prior to the end point of the halogenation, the exact amount of chlorine or bromine necessary for the reaction of any particular starting materials in this step is readily determined without the necessity of experimentation. Alternatively, a free chlorine or bromine indicator may be used to determine the end point.

Solvents commonly employed for halogenations may be used in the halogenation step, e.g., acetic acid, buffered with potassium acetate, methanol, chloroform, and the like. When all of the steps of the present process are carried out without the isolation of the intermediately produced compounds, tertiary butyl alcohol is the preferred solvent since each of the 4 steps of the present process may advantageously be carried out in this solvent, although other solvents may also serve for all 4 steps as will be immediately apparent to one skilled in the art.

Since the halogenation is essentially instantaneous, the reaction time necessary is usually only that time necessary to add the bromine or chlorine at a reasonable rate. The halogenation is preferably carried out at below room temperature, e.g., between about $-5$ and plus 20° C., although temperatures as low as about $-30°$ C. and as high as about 70° C. can also be employed. The thus-halogenated product is usually used without isolation or purification in the next step of the process. The halogenated product may, however, be isolated by addition of a large volume of water to the reaction mixture or, if the reaction solvent is water immiscible, by distillation of the reaction solvent from the mixture and then washing the residue with water. In most instances bromine is the preferred halogenating agent because of the ease with which bromine can be utilized.

Although chlorine or bromine have been found to perform exceedingly well as halogenating agents in the method of the present invention and are therefore preferred, other halogenating agents may be employed to produce the 2,21,21-trihalo steroid of the present invention. Halogenating agents such as, for example, iodine, alkyl hypohalites, e.g., tertiary butyl hypochlorite, ethyl hypochlorite, hypohalous acids, hypochlorous or hypobromous acid, and in situ halogen producing agents such as N-bromosuccinimide or N-bromoacetamide in the presence of acid, may also be employed. However, it is to be understood that the use of some of these agents may result to at least some extent in accompanying oxidation and other side reactions, with corresponding reduction in yields of desired product, and the use of chlorine or bromine is therefore preferred.

The elimination and rearrangement step (3) for the production of $\Delta^{4,17(20)}$-3-keto-21-oic acid alkyl ester steroids or $\Delta^{4,17(20)}$-2-halo-3-keto-21-oic acid alkyl ester steroids involves the reaction, in the presence of an alkanol, of the halogenated steroid material from the halogenation step (2) with a base, e.g., an alkali-metal base, which is preferably an alkali-metal alkoxide, of sufficient strength to convert the halogenated steroid product to a $\Delta^{4,17(20)}$-3-keto-21-oic acid alkyl ester steroid or $\Delta^{4,17(20)}$-2-halo-3-keto-21-oic acid alkyl ester steroid. This step is conveniently accomplished, especially when tertiary butyl alcohol is used as the reaction solvent, by the addition of a large volume of an alkanol and the desired amount of the selected base at about room temperature or higher.

Bases which react readily with the halogenated steroid product, and which are therefore preferred in the elimination and rearrangement step (3), are the alkali-metal alkoxides such as, for example, sodium methoxide, sodium ethoxide, potassium isopropoxide, potassium tertiary butoxide, and the like, and alkali-metal hydroxides such as, for example, potassium hydroxide, sodium hydroxide, or lithium hydroxide. Still other bases which may be used include trimethylbenzyl ammonium hydroxide, calcium carbonate, silver oxide, and the like.

The amount of base and alkanol theoretically required is at least 2 molar equivalents per mole of halogenated steroid, but usually a much larger amount of an alkanol is used and at least a slightly larger amount of base is employed. If the starting reaction mixture is the crude, unisolated halogenation product, and if the hydrogen halide is decomposed with an alkali-metal salt of an aliphatic carboxylic acid, there will be present in the starting mixture of the elimination and rearrangement step (3) an aliphatic carboxylic acid. Since this acid will react with base before the halogenated steroid starting material, an additional amount of base sufficient to react with this residual aliphatic carboxylic acid, when present, should be added in addition to the theoretical minimum of 2 molar equivalents.

The preferred operating conditions comprise the addition of a large volume of an alkanol, such as, for example, ethanol, propanol, isopropanol, butanol, preferably a primary lower-aliphatic alkanol, especially methanol or ethanol, and at least 2 molar equivalents of a base. Preferably an alkali-metal base, of which sodium methoxide or sodium ethoxide are especially desirable, is employed. The resulting mixture is then maintained at about room temperature or above for at least several minutes, sometimes an hour or even longer, depending upon the degree of reactivity of the base and the alkanol with the starting halogenated steroid.

While it was previously stated that bases such as, for example, sodium acetate, potassium octanoate, amines, and the like, are suitable bases for decomposition of hydrogen halide formed in the halogenation step (2) since they do not react to any appreciable extent with the halogenated steroid product, some of these bases, under certain conditions, may be caused to react with the halogenated product. For example, if in the halogenation step (2) the reaction time is of sufficient duration or if the reaction temperature is sufficiently high, such weaker bases may also be used for the production of $\Delta^{4,17(20)}$-3-keto-21-oic acid alkyl ester steroids or $\Delta^{4,17(20)}$-2-halo-3-keto-21-oic acid alkyl ester steroids. Since the halogenation in step (2) is complete in a few minutes, the fact that these bases may slowly react with the halogenation product is inconsequential. However, the weaker bases can, if desired, be reacted with the halogenation product of step (2) by employing a reaction period longer than required to add the halogen to the starting mixture for step (2) to ensure a satisfactory degree of reaction, including both halogenation and the elimination and rearrangement step (3). When operating in this manner, the two steps (2) and (3) become substantially one step.

Isolation of the reaction product, as in the previous steps, may be carried out by the addition of water to the mixture or by other conventional means, but in the preferred procedure the resulting reaction material is used in the final step of the process without isolation or purification.

The 2-dehalogenation step (4) involves the reaction of the 2-halogenated steroid product of the elimination and rearrangement step (3) with a dehalogenating agent, for example, zinc and acetic acid, to convert the $\Delta^{4,17(20)}$-2-halo-3-keto-21-oic acid alkyl ester steroid material produced in the elimination and rearrangement step (3). The number of molar equivalents each of zinc and acetic acid, for best results, should be at least equal to the number of molar equivalents of halogen employed in the halogenation step (2) exceeding two. Thus, although the composition of the steroid reaction product produced in the elimination and rearrangement step (3) may vary widely between material containing small amounts of 2-halogenated product and material consisting essentially or entirely of $\Delta^{4,17(20)}$-2-halo-3-keto-21-oic acid alkyl ester steroid, the resulting product after treatment with a dehalogenating agent, e.g., zinc and acetic acid, is the same, namely, the $\Delta^{4,17(20)}$-3-keto-21-oic acid alkyl ester steroid.

Although the number of molar equivalents of zinc and acetic acid or equivalent dehalogenating agent used in the 2-dehalogenation step (4) may theoretically be equal to the number of molar equivalents of halogen exceeding two employed in the halogenation step (2), calculated on the original starting steroid, since this amount will be about equal to the number of molar equivalents of 2-halogenated steroid present in the mixture, a large molar excess of dehalogenating agent is usually and preferably employed. A substanital molar excess of zinc and acetic acid are usually added to an organic solvent solution of the halogenated steroid product of the elimination and rearrangement step (3) and the resulting slurry stirred, preferably at room temperature or higher temperature, for several minutes to several hours. The resulting steroid material can be isolated by filtering the precipitated inorganic salts and then precipitating the steroid material from the filtrate by distilling the solvent therefrom or by adding a large volume of water to the resulting filtrate. The thus-produced $\Delta^{4,17(20)}$-3-keto-21-oic acid alkyl ester steroid, namely, alkyl ester of 7-methyl-3,11-diketo-4,17(20)-pregnadien-21-oic acid, the compounds of Formula VII, can then be purified in conventional manner, such as, for example, by fractional crystallization and/or chromatography.

Other representative dehalogenating agents which can be used in the 2-dehalogenation step (4) include sodium iodide in acetone or an alkanol, chromyl chloride, deactivated Raney nickel, and the like. Usually, to obtain optimum yields of dehalogenated product, a large molar excess of dehalogenating agent is employed and the reaction is conducted at about room temperature although somewhat higher and lower temperatures frequently produce very satisfactory results.

The following examples are illustrative of the products, process, and uses of the present invention but are not to be construed as limiting.

EXAMPLE 1

*5,8(9)-pregnadiene-3,11,20-trione 3,20-bis(ethylene ketal) (II)*

A mixture of 10.0 g. of 4,8(9)-pregnadiene-3,11,20-trione (I), 200 ml. of benzene, 20 ml. of ethylene glycol and 0.25 g. of p-toluenesulfonic acid was refluxed under a water take-off head until the reaction had gone to completion. The reaction mixture was then cooled in an ice bath and 50 ml. of saturated sodium bicarbonate solution was added thereto with stirring. Layer separation, into an organic and an aqueous layer, occurred and the thus-obtained aqueous layer was extracted with methylene chloride and the extract was combined with the organic layer originally present. The combined organic layers were washed with water followed by removal of the solvent in vacuo. The residue thus obtained was dissolved in 300 ml. of methylene chloride and chromatographed over a column containing 300 g. of Florisil (synthetic magnesium silicate). The column was eluted with Skellysolve B hexanes containing increasing proportions of acetone. The 5% acetone in Skellysolve B hexanes eluate fractions, upon evaporation of the solvent, yielded 9.1 g. of material. Recrystallization of 2.1 g. of the thus-obtained material from aqueous methanol containing a drop of pyridine yielded 1.7 g. of crystalline 5,8(9)-pregnadiene-3,11,20-trione 3,20-bis(ethylene ketal) (II) melting at 130–132° C., having an ultraviolet absorption in ethanol of $\lambda_{max.}$ 241 m$\mu$, $a_M$ 4,460, $\lambda_{flex}$ 265 m$\mu$, $a_M$ 3,420 and the following analysis:

*Analysis.*—Calcd. for $C_{25}H_{34}O_5$: C, 72.43; H, 8.27. Found: C, 72.36; H, 8.34.

The infrared absorption was consistent with the structure proposed.

Similarly, 4,8(9)-pregnadiene-3,11,20-trione is reacted with other 1,2-alkane diols or 1,3-alkane diols to produce the corresponding 3,20-bis-(alkylene ketals) of 5,8-(9)-pregnadiene-3,1,20-trione.

EXAMPLE 2A

*7α-methyl-5,8(9)-pregnadiene-3,11,20-trione 3,20-bis-(ethylene ketal) (IIIα), 7β-methyl-5,8(9)-pregnadiene-3,11,20-trione 3,20-bis-(ethylene ketal) (IIIβ) and 9α-methyl-5,7-pregnadiene-3,11,20-trione 3,20-bis-(ethylene ketal) (X)*

A solution of 1.399 g. of 5,8(9)-pregnadiene-3,11,20-trione 3,20-bis-(ethylene ketal) (II) in 20 ml. of tertiary butyl alcohol was treated with 3.6 ml. of 1.1 N potassium tertiary butoxide and the reaction mixture thus obtained was cooled in a Dry Ice-acetone bath. The reaction vessel was evacuated and a mixture of 0.72 ml. of methyl iodide and 0.185 g. of $C^{14}$ methyl iodide which had previously been distilled into a trap was admitted by distillation. The reaction vessel was warmed to room temperature in a water bath and the reaction mixture stirred for 2.5 hours. At this time the reaction mixture was essentially neutral. 20 ml. of water was added to dissolve the potassium iodide which had precipitated and the tertiary butyl alcohol was then removed by distillation in vacuo. The product thus obtained was then extracted twice with methylene chloride followed by the removal of the solvent in vacuo. The residue thus obtained was redissolved in methylene chloride and chromatographed over a column containing 150 g. of Florisil (synthetic magnesium silicate). The column was then eluted with 100-ml. portions of solvents as shown by the following table (Table I).

TABLE I

| Fraction | Eluate | Net Wt. (mg.) |
| --- | --- | --- |
| 1 | Methylene Chloride | 17 |
| 2 | 3% Acetone, Skellysolve B | 1 |
| 3 | do | 4 |
| 4 | do | 24 |
| 5 | do | 131 |
| 6 | do | 236 |
| 7 | do | 199 } 0.685 g. |
| 8 | do | 119 |
| 9 | do | 80 |
| 10 | do | 62 |
| 11 | do | 61 |
| 12 | 10% Acetone-Skellysolve B | 285 |
| 13 | do | 66 } 0.351 g. |
| 14 | do | 16 |
| 15 | do | 9 |
| 16 | do | 7 |
| 17 | do | 10 |
| 18 | do | 14 |
| 19 | do | 17 |
| 20 | do | 16 |
| 21 | Acetone | 87 |
| 22 | do | 13 |

The solvent was evaporated from fractions 5 through 8 and the residues were combined to give 0.685 g. of material. Recrystallization from methanol yielded 0.466 g. of 9α-methyl-5,7-pregnadiene-3,11,20-trione 3,20-bis-(ethylene ketal) (X) having an ultraviolet absorption in ethanol of $\lambda_{max}$ 272 m$\mu$, $a_M$ 8,675, $\lambda_{max}$ 281.5 m$\mu$, $a_M$ 8,300.

The solvent was evaporated from fractions 12 and 13 and the residues were combined to give 0.351 g. of material. Recrystallization from methanol yielded 0.129 g. of 7α-methyl-5,8(9)-pregnadiene-3,11,20-trione 3,20-bis-(ethylene ketal) (IIIα), having an ultraviolet absorption in ethanol of $\lambda_{max}$. 254 m$\mu$, $a_M$ 5,800, and a mother liquor which upon evaporation yielded 0.199 g. of a mixture of 7α-methyl-5,8(9)-pregnadiene-3,11,20-trione 3,20-bis-(ethylene ketal) (IIIα) and 7β-methyl-5,8(9)-pregnadiene-3,11,20-trione 3.20-bis-(ethylene ketal) (IIIβ).

Similarly, substituting other 5,8(9)-pregnadiene-3,11,20-trione 3,20-bis-(alkylene ketals) for 5,8(9)-pregnadiene-3,11,20-trione 3,20-bis-(ethylene ketal) there are obtained the corresponding 7α-methyl and 7β-methyl-5,8-(9)-pregnadiene-3,11,20-trione 3,20-bis-(alkylene ketals) and 9α-methyl - 5,7 - pregnadiene-3,11,20-trione 3,20-bis-(alkylene ketals).

EXAMPLE 2B

*7α-methyl- and 7β-methyl - 5,8(9) - pregnadiene-3,11,20-trione 3,20-bis-(ethylene ketal) (IIIα, and IIIβ, respectively)*

5.9 g. of material obtained by combining the 7-methyl fractions from several methylations of 5,8(9)-pregnadiene-3,11,20-trione 3,20-bis-(ethylene ketal) (II) was recrystallized from methanol. A first crop of crystals was obtained weighing 1.25 g. The crystals so obtained were redissolved in methylene chloride and chromatographed on a column containing 100 g. of Florisil (synthetic magnesium silicate). The column was then eluted with 200-ml. portions of 5% acetone in Skellysolve B hexanes. The solvent was evaporated from the thus-obtained fractions to yield the residues as shown in the following table (Table II).

TABLE II

| Residue from Fraction | Wt., grams | M.P., degrees |
| --- | --- | --- |
| 6 | 0.053 | 130 |
| 7 | 0.573 | 135–182 |
| 8 | 0.452 | 175–185 |
| 9 | 0.188 | 175–185 |
| 10 | 0.059 | 175–185 |

The residue from fraction 7 was leached with boiling Skellysolve B hexanes and the leached liquid obtained therefrom was combined with the residue from fraction 6, and the solvent evaporated therefrom leaving a crystalline residue. This crystalline residue was then recrystallized from methanol to yield 0.13 g. of a mixture of 7α - methyl - 5,8(9) - pregnadiene-3,11,20-trione 3,20-bis-(ethylene ketal) (IIIα) and 7β-methyl-5,8(9)-pregadiene-3,11,20-trione 3,20-bis-(ethylene ketal) (IIIβ) having a melting point of 135–147° C., and an ultraviolet absorption in ethanol of $\lambda_{max}$. 264 m$\mu$, $a_M$ 4,975, $\lambda_{flex}$ 248 m$\mu$, $a_M$ 4,775. The leaching residue obtained from the leaching of the residue from fraction 7 was combined with the residues from fractions 8 through 10. Recrystallization of these residues from methanol yielded 0.56 g. of 7β-methyl-5,8(9)-pregnadiene-3,11,20-trione 3,20-bis-(ethylene ketal) (IIIβ) melting at 193–197° C. and having an ultraviolet absorption in ethanol of $\lambda_{max}$. 253 m$\mu$, $a_M$ 5,700.

A second crop of crystals weighing 1.5 g. was obtained from the methanol mother liquor remaining after the first recrystallization from methanol of the 7-methyl fractions. This second crop of crystals was redissolved in methylene chloride and chromatographed over a column containing 150 g. of Florisil (synthetic magnesium silicate). The column was eluted with 300-ml. portions of 5% acetone in Skellysolve B hexanes. Fractions 6 through 8 were combined to yield 0.807 g. of crude material which was recrystallized from methanol to yield 0.25 g. of 7α-methyl-5,8(9)-pregnadiene-3,11,20-trione 3,20-bis-(ethylene ketal) (IIIα) having a melting point of 171–173° C. and an ultraviolet absorption in ethanol of $\lambda_{max}$. 242 m$\mu$, $a_M$ 5,300, $\lambda_{flex}$ 264 m$\mu$, $a_M$ 3,850. Fractions 9 through 12 yielded 0.587 g. of crude material which was recrystallized from methanol to yield 0.25 g. of 7α-methyl-5,8(9)-pregnadiene-3,11,20-trione 3,20-bis-(ethylene ketal) (IIIα) having a melting point of 164–171° C. and an ultraviolet absorption in ethanol of $\lambda_{max}$. 245 m$\mu$, $a_M$ 5,225, $\lambda_{flex}$ 270 m$\mu$, $a_M$ 3,725. Both ultraviolet and infrared absorption confirmed that the material obtained from fractions 6 through 8 and fractions 9 through 12 were the same compound.

The mother liquor remaining following the obtention of the second crop of crystals was evaporated giving 3.15 g. of material which was dissolved in methylene chloride and chromatographed on a column containing 250 g. of Florisil (synthetic magnesium silicate). The column was eluted with 500-ml. portions of 5% acetone in Skellysolve B hexanes. Fractions 6 through 10 were combined to yield 1.462 g. of a crystalline material. Recrystallization of this material from methanol yielded 0.92 g. of 7α-methyl-5,8(9)-pregnadiene-3,11,20-trione 3,20-bis-(ethylene ketal) (IIIα) having a melting point of 167–172° C. and an ultraviolet absorption in ethanol of $\lambda_{max}$. 242 m$\mu$, $a_M$ 5,175, $\lambda_{flex}$ 264 m$\mu$, $a_M$ 4,075. Fractions 11 through 13 were combined to yield 1.236 g. of a crystalline material. Recrystallization of this material from methanol yielded 0.89 g. of 7α-methyl-5,8(9) - pregnadiene - 3,11,20-trione 3,20-bis-(ethylene ketal) (IIIα) having a melting point of 167–172° C. and an ultraviolet absorption in ethanol of $\lambda_{max}$. 244 m$\mu$, $a_M$ 5,225, $\lambda_{flex}$ 264 m$\mu$, $a_M$ 4,125. Fractions 15 through 18 were combined to yield 0.251 g. of a crystalline material. Recrystallization of this material from methanol yielded 0.12 g. of 7α-methyl-5,8(9)-pregnadiene-3,11,20-trione 3,20-bis-(ethylene ketal) (IIIα) having a melting point of 167–172° C., after softening at 157° C., and an ultraviolet absorption in ethanol of $\lambda_{max}$. 243 m$\mu$, $a_M$ 5,350, $\lambda_{flex}$ 268 m$\mu$, $a_M$ 3,800.

In like manner, substituting 7-methylated fractions obtained from the methylation of other 5,8(9)-pregnadiene-3,11,20-trione 3,20-bis-(alkylene ketals) for the 7-methylated fractions obtained from the methylation of 5,8(9)-pregnadiene-3,11,20-trione 3,20-bis-(ethylene ketal) is productive of the corresponding 7α-methyl and 7β - methyl - 5,8(9)-pregnadiene-3,11,20-trione 3,20-bis-(alkylene ketals).

EXAMPLE 3

*Conversion of 7α-methyl-5,8(9)-pregnadiene- 3,11,20-bis-(ethylene ketal) (IIIα) to 7α-methyl-4-pregnene-3,11,20-trione (VIα)*

A solution of 11.1 g. of crude 7α-methyl-5,8(9)-pregnadiene-3,11,20-trione 3,20-(ethylene ketal) (IIIα) in 250 ml. of dioxane was added with stirring to 800 ml. of anhydrous ammonia maintained in a Celite bath. 3.5 g. of metallic lithium was then added portionwise and stirring was continued. After three hours the excess lithium was destroyed by the addition of solid ammonium chloride and the ammonia was allowed to evaporate. When the residue, containing 7α-methyl-11α-hydroxy-5-pregnene-3,20-dione 3,20-bis-(ethylene ketal) (IVα), became a sludge 500 ml. of methylene chloride and 500 ml. of water were added thereto and the mixture was stirred for a short time and then allowed to stand. Layer separation occurred and the solvent was removed from the organic layer in vacuo leaving a residue weighing 10.8 g. The residue thus obtained was dissolved in 150 ml. of acetone and 30 ml. of dioxane and a solution containing 20 ml. of water and 20 drops of concentrated sulfuric acid was added thereto. The solution thus obtained was allowed to stand about 18 hours, followed by neutralization with saturated sodium bicarbonate solution and removal of the solvent in vacuo to leave a residue. This residue was then partitioned between methylene chloride and water and the methylene chloride (organic) layer was separated from the aqueous layer. The methylene chloride was evaporated leaving crude 7α-methyl-11α-hydroxy-4-pregnene-3,20-dione (Vα), which was then dissolved in 50 ml. of glacial acetic acid and 10 g. of sodium dichromate dihydrate was added thereto. The reaction mixture was stirred for 2 hours at room temperature and then diluted with 200 ml. of water. The reaction mixture was then extracted with methylene chloride and the methylene chloride solution was washed with saturated sodium bicarbonate solution followed by evaporation of the methylene chloride. The residue thus obtained was then dissolved in methylene chloride and chromatographed over a column containing 400 g. of Florisil (synthetic magnesium silicate). The column was then eluted with 15% acetone in Skellysolve B hexanes. Following evaporation of the eluted fractions there was obtained 3.33 g. of crude 7α-methyl-4-pregnene-3,11,20-trione (VIα). A sample of the 7α-methyl-4-pregnene-3,11,20-trione (VIα) from the chromatographic column was recrystallized from acetone-Skellysolve B hexanes to yield crystals of 7α-methyl-4-pregnene-3,11,20-trione (VIα) melting at 198–200° C., having an $[\alpha]_D$ (chloroform) of plus 270°, an ultraviolet absorption in ethanol of $\lambda_{max.}$ 239 m$\mu$, $a_M$ 15,775, and the following analysis:

Analysis.—Calcd. for $C_{22}H_{30}O_3$: C, 77.15; H, 8.83. Found: C, 77.13; H, 8.92.

Similarly, the substitution of other 7α-methyl-5,8(9)-pregnadiene-3,11,20-trione 3,20-bis(alkylene ketals) for 7α-methyl-5,8(9)-pregnadiene-3,11,20-trione 3,20-bis(ethylene ketal) is productive of 7α-methyl-4-pregnene-3,11,20-trione.

EXAMPLE 4

Methyl ester of 7α-methyl-3,11-diketo-4,17(20)-[cis]-pregnadien-21-oic acid (VIIα)

A solution containing 1.91 g. of 7α-methyl-4-pregnene-3,11,20-trione (VIIα) in 20 ml. of tertiary butyl alcohol and 3.02 ml. of ethyl oxalate was stirred under nitrogen at 60° C. 3.02 g. of sodium methoxide in methanol (25% NaOCH$_3$ wt./wt.) was added and the mixture was then allowed to cool to room temperature. After 1 hour a solution containing 0.68 g. of sodium acetate and 0.79 ml. of glacial acetic acid in 45 ml. of methanol, which had been precooled to 5° C. in a cooling bath was added. A precooled solution of 2.7 g. of bromine in 27 ml. of methanol was then added at such a rate that the reaction temperature did not rise above 6° C. and until a permanent bromine color persisted. The reaction mixture was then allowed to stand for 10 minutes and 6.2 g. of sodium methoxide in methanol (25% NaOCH$_3$ wt./wt.) was added thereto. The cooling bath was then removed and the reaction mixture stirred for 1.5 hours. 5 ml. of acetic acid and 1.0 g. of zinc dust were added and the mixture was stirred for 30 minutes and then filtered. The filtrate was reduced to half its volume in vacuo and 150 ml. of water was added thereto. The reaction mixture was then allowed to crystallize. The crystals that were obtained were removed by filtration and oven dried yielding a crude product which was then treated with methylene chloride to separate the organic material from the inorganic salts. The methylene chloride layer containing the organic material was then chromatographed on a column containing 200 g. of Florisil (synthetic magnesium silicate). The column was then eluted with 10% acetone in Skellysolve B hexanes and following removal of the solvent there was obtained a crystalline product weighing 1.22 g. Recrystallization of this product from methanol gave a first crop of crystals of methyl ester of 7α-methyl-3,11-diketo-4,17(20)-[cis]-pregnadien-21-oic acid (VIIα) weighing 0.60 g., having a melting point of 210–215° C. and an ultraviolet absorption in ethanol of $\lambda_{max.}$ 233 m$\mu$, $a_M$ 23,775 and the following analysis:

Analysis.—Calcd. for $C_{23}H_{30}O_4$: C, 74.56; H, 8.16. Found: C, 74.44; H, 8.24.

The infrared absorption analysis was in agreement with the structure proposed.

Similarly, substituting another alkali-metal alkoxide and an alkanol, wherein in the alkyl group is ethyl, propyl, butyl, amyl, hexyl, heptyl, octyl, or the like, for the sodium methoxide and methanol following the halogenation step above, there are obtained the corresponding lower-alkyl esters of 7α-methyl-3,11-diketo-4,17(20)-[cis]-pregnadien-21-oic acid as the final products.

EXAMPLE 5

7α-methyl-11β,21-dihydroxy-4,17(20)-[cis]-pregnadien-3-one 21-acetate (VIIIα)

0.78 g. of methyl ester of 7α-methyl-3,11-diketo-4,17(20)-pregnadien-21-oic acid, 15.5 ml. of benzene, 0.02 g. of p-toluenesulfonic acid and 0.4 ml. of pyrrolidine were refluxed under nitrogen for 1 hour. The solvent was removed in vacuo from the thus-obtained reaction mixture and the residue obtained was redissolved in 15 ml. of benzene and added to a pre-prepared solution containing 0.25 g. of lithium aluminum hydride in 21 ml. of absolute ether. The thus-obtained reaction mixture was then decomposed by the careful addition of 1.5 ml. of ethyl acetate followed by the careful addition of 2.2 ml. of water. The mixture was then filtered and the cake remaining was washed with ether. The ether washings were combined with the originally obtained filtrate. There was then added, while stirring under nitrogen, a solution containing 3.0 ml. of methanol and 0.6 ml. of glacial acetic acid. Stirring, under nitrogen, was continued for 30 minutes, followed by the addition of 8 ml. of a 10% solution of sodium hydroxide with stirring. The mixture was then stirred under nitrogen for an additional hour followed by shaking with water and then with a solution of concentrated hydrochloric acid (2.5 ml. of hydrochloric acid in 15 ml. of water). Layer separation occurred giving an aqueous layer and an organic layer. The organic layer was washed with saturated sodium bicarbonate solution and then with saturated sodium chloride solution. The solvent was removed in vacuo to yield a white foam. The foam was then treated with 3 ml. of acetic anhydride, 3 ml. of pyridine and the thus-obtained acetylation mixture was allowed to stand for about 18 hours. The mixture was then diluted with water whereupon a gum separated. The product was extracted with methylene chloride and the extract was washed with saturated sodium bicarbonate solution. The methylene chloride was removed in vacuo leaving an oil. The oil was then dissolved in methylene chloride and chromatographed over a column containing 50 g. of Florisil (synthetic magnesium silicate). The column was eluted with 8% acetone in Skellysolve B hexanes. Following removal of the solvent, 0.549 g. of 7α-methyl-11β,21-dihydroxy-4,17(20)-[cis]-pregnadien-3-one 21-acetate (VIIIα), a partially crystalline oil was obtained as a residue, which was used directly in the following example, Example 6.

Similarly, substituting the anhydride of an organic carboxylic acid, particularly a hydrocarbon carboxylic acid containing from 1 to 12 carbons, inclusive, for example, a saturated straight-chain aliphatic acid, e.g., propionic, butyric, valeric, hexanoic, lauric, a saturated branched-chain aliphatic acid, e.g., trimethylacetic, isobutyric, isovaleric, a cycloaliphatic saturated acid, e.g., cyclohexane-carboxylic, an alkaryl acid, e.g., benzoic, phenyl-acetic, 2-phenylpropionic, o-, m-, and p-toluic, a saturated dibasic acid (which can be converted into water-soluble, e.g., sodium, salts), e.g., succinic, adipic, a monobasic unsaturated acid, e.g., acrylic, crotonic, undecylenic, propiolic, cinnamic, a dibasic unsaturated acid (which can be converted into water-soluble, e.g., sodium, salts), e.g., maleic and citraconic, or the like, for the acetic anhydride above, there are produced the 21-acylates of 7α-methyl-11β, 21-dihydroxy-4,17(20)-[cis]-pregnadien-3-one corresponding to the particular anhydride substituted.

EXAMPLE 6

*7α-methyl-11β,17α,21 - trihydroxy-4-pregnene-3,20-dione 21-acetate (IXα)*

0.549 g. of 7α-methyl-11β,21-dihydroxy-4,17(20)-[cis]-pregnadien-3-one 21-acetate (VIIIα), 22 ml. of tertiary butyl alcohol, 0.25 ml. of pyridine, 2.4 ml. of N-methyl-morpholine oxide peroxide solution (which required 40.5 ml. of 0.1 N sodium thiosulfate for titration of 1 ml. of solution) and 3.46 mg. of osmium tetroxide in 1 ml. of tertiary butyl alcohol were combined and stirred for about 18 hours. 0.11 g. of a crystalline product that precipitated during the stirring was removed by filtration. The filtrate was diluted with water and extracted with methylene chloride. The methylene chloride extract was chromatographed over a column containing Florisil (synthetic magnesium silicate). The column was then eluted with 10% acetone in Skellysolve B hexanes. On evaporation of the eluted fractions there was obtained 0.078 g. of a crude material containing 7α-methyl-11β,17α,21-trihydroxy-4-pregnene-3,20-dione 21-acetate (IXα). This crude material was recrystallized from acetone to yield two crops of 7α-methyl - 11β,17α,21-trihydroxy-4-pregnene-3,20-dione 21-acetate (IXα) crystals, the first weighing 0.036 g. and melting at 240–245° C. and the second weighing 0.015 g. and melting at 242–250° C.

The crystalline product, weighing 0.11 g., which precipitated from the reaction mixture originally was recrystallized from acetone to yield a first crop of crystals of 7α-methyl-11β,17α,21-trihydroxy-4-pregnene-3,20 - dione 21-acetate (IXα) weighing 0.048 g., melting at 246–250° C. and having an ultraviolet absorption in ethanol of $\lambda_{max}$.243 m$\mu$, $a_M$ 15,675 and the following analysis:

*Analysis.*—Calcd. for $C_{24}H_{34}O_6$: C, 68.85; H, 8.19. Found: C, 68.15; H, 8.00.

The mother liquors obtained from the recrystallization of the originally precipitated 0.11 g. of crystalline product yielded a second crop of crystals of 7α-methyl-11β,17α, 21-trihydroxy-4-pregnene-3,20 - dione 21 - acetate (IXα) weighing 0.028 g. and melting at 235–240° C.

Similarly, substituting other 21-acylates of 7α-methyl-11β,21-dihydroxy-4,17(20)-[cis]-pregnadien - 3 - one for 7α-methyl-11β,21-dihydroxy-4,17(20)-[cis] - pregnadien-3-one 21-acetate, is productive of the corresponding 21-acylates of 7α - methyl-11β,17α,21-trihydroxy-4-pregnene-3,20-dione, for example, the 21-propionate, 21-butyrate, 21-valerate, 21-hexanoate, 21-laurate, 21-trimethylacetate, 21-isobutyrate, 21-isovalerate, 21-cyclohexanecarboxylate, 21-benzoate, 21-phenylacetate, 21-(β-phenylpriopionate), 21-(o-, m-, p-toluate), 21-hemisuccinate, 21-hemiadipate, 21-crotonate, 21-acrylate, 21-undecylenate, 21-propiolate, 21-cinnamate, 21-maleate, 21-citraconate, and the like.

EXAMPLE 7

*7β-methyl-11α-hydroxy-5-pregnene-3,20-dione 3,20-bis-(ethylene ketal) (IVβ)*

1.51 g. of 7β-methyl-5,8(9)-pregnadiene-3,11,20-trione 3,20-bis-(ethylene ketal) (IIIβ) was dissolved in 30 ml. of dioxane and the resulting solution was added to liquid ammonia, maintained in a Celite bath. 0.50 g. of metallic lithium was then added to the reaction mixture, with stirring. The reaction mixture was stirred for 2.5 hours after which time the excess lithium was destroyed by the addition of solid ammonium chloride. The ammonia was then allowed to evaporate and the remaining sludge partitioned between methylene chloride and water. The organic layer was separated from the aqueous layer and the solvent was removed from the organic layer in vacuo leaving a crystalline residue. The crystalline residue was then recrystallized from methanol to yield 0.98 g. of 7β-methyl-11α-hydroxy-5-pregnene - 3,20 - dione 3,20 - bis-(ethylene ketal) (IVβ) melting at 225–228° C. and having the following analysis:

*Analysis.*—Calcd. for $C_{26}H_{40}O_5$: C, 72.19; H, 9.32. Found: C, 72.32; H, 9.44.

The infrared absorption was in agreement with the structure proposed.

Similarly, substituting other 7β-methyl-5,8(9)-pregnadiene-3,11,20-trione 3,20-bis-(alkylene ketals) for 7β-methyl-5,8(9)-pregnadiene-3,11,20-trione 3,20-bis - (ethylene ketal) is productive of the corresponding 7β-methyl-11α-hydroxy-5-pregnene-3,20-dione 3,20 - bis - (alkylene ketals).

EXAMPLE 8

*7β-methyl-11α-hydroxy-4-pregnene-3,20-dione (Vβ)*

0.80 g. of 7β-methyl-11α-hydroxy - 5 - pregnene - 3,20-dione, 3,20-bis-(ethylene ketal) (IVβ) was dissolved in a mixture of 60 ml. of acetone and 20 ml. of dioxane. 10 ml. of water containing 10 drops of concentrated sulfuric acid was added and the reaction mixture was allowed to stand for 12 to 18 hours at room temperature. The acid was then neutralized with an excess of saturated sodium bicarbonate solution, and the solvent evaporated in vacuo. The residue thus obtained was partitioned between water and methylene chloride and following separation into an aqueous and an organic layer, the solvent was evaporated from the organic layer in vacuo leaving 0.651 g. of a residue having an ultraviolet absorption in ethanol of $\lambda_{max}$.244 m$\mu$. The residue thus obtained was recrystallized from acetone-Skellysolve B hexanes to yield crystals of 7β-methyl-11α-hydroxy-4-pregnene-3,20-dione (Vβ) melting at 156–159° C., having an ultraviolet absorption in ethanol of $\lambda_{max}$.244 m$\mu$, $a_M$ 15,600, and the following analysis:

*Analysis.*—Calcd. for $C_{22}H_{32}O_3$: C, 76.70; H, 9.36. Found: C, 76.34; H, 9.50.

Infrared absorption was in agreement with the structure proposed.

Similarly, substituting other 7β-methyl-11α-hydroxy-5-pregnene-3,20-dione 3,20-bis-(alkylene ketals) for 7β-methyl-11α-hydroxy-5-pregnene-3,20-dione 3,20-bis-(ethylene ketal) is productive of 7β-methyl - 11α - hdroxy - 4-pregnene-3,20-dione.

EXAMPLE 9

*7β-methyl-4-pregnene-3,11,20-trione (VIβ)*

0.25 g. of 7β-methyl-11α - hydroxy - 4 - pregnene - 3,20-dione (Vβ) was dissolved in 3 ml. of glacial acetic acid. 0.25 g. of solid sodium dichromate dihydrate was added thereto and the mixture thus obtained was stirred at room temperature for 2 hours. The mixture was then diluted with 15 ml. of water and the crystalline product which separated was recrystallized from acetone-Skellysolve B hexanes to yield 0.16 g. of 7β-methyl-4-pregnene-3,11,20-trione (VIβ) melting at 148–150° C., having an

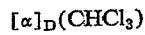

of plus 255°, and an ultraviolet absorption in ethanol of $\lambda_{max}$.239 m$\mu$, $a_M$ 15,600, and the following analysis:

*Analysis.*—Calcd. for $C_{22}H_{30}O_3$: C, 77.15; H, 8.83. Found: C, 77.15; H, 8.83.

Infrared absorption was in agreement with the structure proposed.

EXAMPLE 10

*Methyl ester of 7β-methyl-3,11 - diketo - 4,17(20)-[cis]-pregnadien-21-oic acid (VIIβ)*

A solution containing 1.3 g. of 7β-methyl-4-pregnene-3,11,20-trione (VIβ), 13 ml. of tertiary butyl alcohol and 2.05 ml. of ethyl oxalate was treated with 1.95 g. of sodium methoxide in methanol (26.3% NaOCH₃ wt./wt.). Upon addition of the methanolic sodium methoxide the mixture turned dark brown and almost immediately a solid separated. The mixture was then stirred for 30 minutes. The reaction mixture was cooled in an ice bath and there was added thereto a solution containing 30 ml. of methanol, 0.46 g. sodium acetate and 0.54 ml. of glacial acetic acid which had previously been prepared and cooled to 10° C. There was then added a solution containing 1.8 g. of bromine in 18 ml. of methanol which had previously been prepared and cooled in an ice bath. The bromine solution was added dropwise to the reaction mixture at such a rate that the temperature did not rise above 8° C. When the addition of the bromine solution was completed, the mixture was then stirred for 10 minutes and 4.0 g. of sodium methoxide in methanol (26.3% NaOCH$_3$ wt./wt.) was added thereto. The thus-obtained mixture was stirred for 75 minutes and 3.2 ml. of glacial acetic acid and 0.64 g. of zinc powder was added and stirring was continued. After 1 hour the zinc had disappeared. An additional portion of 0.6 g. of zinc was added and the stirring was continued for another 30 minutes followed by filtration of the reaction mixture. The filtrate which was obtained was diluted with water and then extracted with methylene chloride. The methylene chloride extract was washed with water and saturated sodium bicarbonate solution and then the methylene chloride was evaporated to yield a residue. The thus-obtained residue was then chromatographed over a column of Florisil (snythetic magnesium silicate) and eluted with 10% acetone in Skellysolve B hexanes. The eluted fractions thus obtained yielded 0.585 g. of methyl ester of 7β-methyl-3,11-diketo-4,17(20)-[cis]-pregnadien-21 - oic acid melting at 213–218° C., and having an [α]$_D$ (acetone) of plus 184°, and an ultraviolet absorption in ethanol of $\lambda_{max}$.233 m$\mu$, $a_M$20,625, and the following analysis:

Analysis.—Calcd. for C$_{23}$H$_{30}$O$_4$: C, 74.56; H, 8.16. Found: C, 74.26; H, 8.20.

In like manner, substituting another alkali-metal alkoxide and an alkanol, wherein the alkyl group is ethyl, propyl, butyl, amyl, hexyl, heptyl, octyl or the like, for the sodium methoxide and methanol following the halogenation step above, there are obtained the corresponding lower-alkyl esters of 7β-methyl-3,11-diketo-4,17(20)-[cis]-pregnadien-21-oic acid as the final products.

EXAMPLE 11

7β-methyl-11β,21-dihydroxy-4,17(20)-[cis]-pregnadien-3-one-21-acetate (VIIIβ)

A solution of 0.50 g. of methyl ester of 7β-methyl-3,11-diketo-4,17(20)-pregnadiene-21-oic acid (VIIβ), 0.01 g. of p-toluenesulfonic acid, 0.23 ml. of pyrrolidine and 10 ml. of benzene was refluxed for 1 hour under nitrogen in an apparatus equipped with a water trap. The mixture was then concentrated in vacuo and the residue obtained was redissolved in 15 ml. of benzene and added to a pre-prepared solution of 0.16 g. of lithium aluminum hydride in 15 ml. of absolute ether. The mixture was then stirred at room temperature for 2 hours and then refluxed for 30 minutes. The reaction mixture thus obtained was cooled in an ice bath and there was then cautiously added 1 ml. of ethyl acetate followed by the cautious addition of 1.5 ml. of water. The mixture thus obtained was filtered and a solution of 0.4 ml. of glacial acetic acid and 2.0 ml. of methanol was added thereto followed by allowing the mixture to stand under nitrogen for 30 minutes. 5 ml. of a 10% sodium hydroxide solution was then added and the mixture stirred under nitrogen for 15 minutes. Following shaking of the mixture with water, an aqueous and an organic layer separated. The organic layer was washed with dilute hydrochloric acid and then with saturated sodium bicarbonate solution. The solvent was removed from the organic layer in vacuo leaving a residue. To this residue there was then added 2 ml. of acetic anhydride and 2 ml. of pyridine and the reaction mixture thus obtained was allowed to stand for 18 hours. The acetylation mixture thus produced was then decomposed by the addition of dilute hydrochloric acid. The product thus obtained was extracted with methylene chloride and washed with saturated sodium bicarbonate. The solvent was evaporated and the residue thus obtained was chromatographed over a column containing 50 g. of Florisil (synthetic magnesium silicate). The column was then eluted with 8% acetone-Skellysolve B hexanes. Following removal of the solvent, 0.23 g. of crystalline product was obtained. A portion of the product was recrystallized from Skellysolve B hexanes-acetone to yield 7β-methyl-11β,21-dihydroxy-4,17(20)-[cis] - pregnadien - 3 - one 21-acetate (VIIIβ) melting at 169–174° C., having an [α]$_D$ (chloroform) of plus 139°, an ultraviolet absorption in ethanol of $\lambda_{max}$.243 m$\mu$, $a_M$16,050, and the following analysis:

Analysis.—Calcd. for C$_{24}$H$_{34}$O$_4$: C, 74.57; H, 8.87. Found: C, 73.95; H, 8.39.

Similarly, substituting the anhydride of an organic carboxylic acid, particularly a hydrocarbon carboxylic acid containing from 1 to 12 carbons, inclusive, for example, a saturated straight-chain aliphatic acid, e.g., propionic, butyric, valeric, hexanoic, lauric, a saturated branched-chain aliphatic acid, e.g., trimethylacetic, isobutyric, isovaleric, a cycloaliphatic saturated acid, e.g., cyclohexane-carboxylic, an alkaryl acid, e.g., benzoic, phenylacetic, 2-phenylpropionic, o-, m-, and p-toluic, a saturated dibasic acid (which can be converted into water-soluble, e.g., sodium, salts), e.g., succinic, adipic, a monobasic unsaturated acid, e.g., acrylic, crotonic, undecylenic propiolic cinnamic, a dibasic unsaturated acid (which can be converted into water-soluble, e.g., sodium, salts), e.g., maleic and citraconic, or the like, for the acetic anhydride above, there are produced the 21-acylates of 7β-methyl-11β,21-dihydroxy-4,17(20)-[cis]-pregnadien - 3 - one corresponding to the particular anhydride substituted.

EXAMPLE 12

7β-methyl-11β,17α,21-trihydroxy-4-pregnene-3,20-dione 21-acetate (IXβ)

Substituting 7β-methyl-11β,21 - dihydroxy - 4,17(20)-[cis]-pregnadien-3-one 21-acetate (VIIIβ) for 7α-methyl-11β,21-dihydroxy-4,17(20)-[cis]-pregnadien - 3 - one 21-acetate (VIIIα) and following the procedure of Example 6 is productive of 7β-methyl-11β,17α,21 - trihydroxy - 4-pregnene-3,20-dione 21-acetate (IXβ).

Similarly, the substitution of other 21-acylates of 7β-methyl-11β,21-dihydroxy-4,17(20)-[cis] - pregnadien- 3-one in the procedure of Example 6 is productive of the corresponding 21-acylates of 7β-methyl-11β,17α,21-trihydroxy-4-pregnene-3,20-dione, for example, the 21-propionate, 21-butyrate, 21-valerate, 21-hexanoate, 21-laurate, 21-trimethylacetate, 21-isobutyrate, 21-isovalerate, 21-cyclohexanecarboxylate, 21-benzoate, 21 - phenylacetate, 21-(β-phenylpropionate), 21-(o-, m-, p-toluate), 21- hemisuccinate, 21-hemiadipate, 21-acrylate, 21-crotonate, 21-undecylenate, 21-propiolate, 21-cinnamate, 21-maleate, and 21-citraconate, or the like.

It is to be understood that the invention is not to be limited to the exact details of operation or exact compounds shown and described, as obvious modifications and equivalents will be apparent to one skilled in the art and the invention is therefore to be limited only by the scope of the appended claims.

I claim:

1. The process which comprises reacting a compound of the formula:

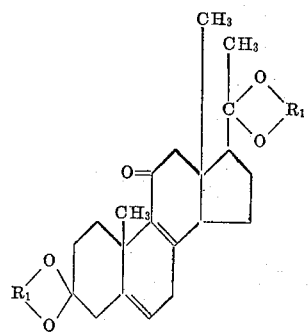

wherein $R_1$ is an alkylene radical containing not more than 8 carbon atoms, inclusive, and the attaching oxygen to carbon bonds are separated by a chain of at least 2 and not more han 3 carbon atoms, with a methyl halide in the presence of a lower-alkyl alcohol and a base catalyst to produce a compound of the formula:

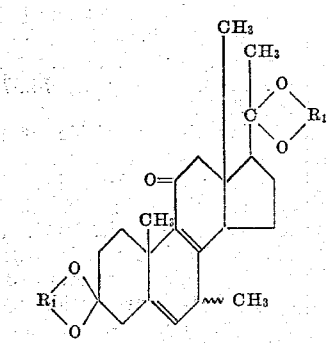

wherein $R_1$ has the meaning previously given.

2. The process of claim 1 in which the starting material is 5,8(9)-pregnadiene-3,11,20-trione 3,20-bis-(ethylene ketal) and the products obtained are 7α-methyl-5,8(9)-pregnadiene-3,11,20-trione 3,20 bis-(ethylene ketal) and 7β-methyl-5,8(9)-pregnadiene-3,11,20-trione 3,20-bis-(ethylene ketal).

3. The process of claim 2 in which the methyl halide is methyl iodide, the lower-alkyl alcohol is tertiary butyl alcohol and the base catalyst is potassium tertiary butoxide.

4. A compound represented by the following formula:

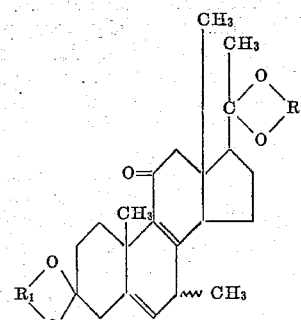

wherein $R_1$ is an alkyl radical containing not more than eight carbon atoms, inclusive, and the attaching oxygen to carbon bonds are separated by a chain of at least 2 and not more than 3 carbon atoms.

5. 7-methyl-5,8(9)-pregnadiene-3,11,20-trione 3,20-bis (ethylene ketal).

6. 7α-methyl-5,8(9)-pregnadiene-3,11,20-trione - 3,20-bis (ethylene ketal).

References Cited in the file of this patent

UNITED STATES PATENTS

| | | |
|---|---|---|
| 2,714,601 | Fonken et al. | Aug. 2, 1955 |
| 2,735,856 | Hogg et al. | Feb. 21, 1956 |
| 2,880,135 | Eppstein | Mar. 31, 1959 |

OTHER REFERENCES

Robinson et al.: Jour. Amer. Chem. Soc. (1959), vol. 81, p. 408 relied on.

Campbell et al.: Jour. Amer. Chem. Soc. (1959), vol. 81, pp. 4069–4074 relied on.